(12) United States Patent
Liu et al.

(10) Patent No.: US 9,917,765 B2
(45) Date of Patent: Mar. 13, 2018

(54) CROSS-DOMAIN PROTECTION INTERACTING METHOD AND SYSTEM

(71) Applicant: ZTE CORPORATION, Shenzhen, Guangdong Province (CN)

(72) Inventors: Guoman Liu, Shenzhen (CN); Bin Luo, Shenzhen (CN); Yuxia Ma, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 199 days.

(21) Appl. No.: 14/647,039

(22) PCT Filed: Aug. 12, 2013

(86) PCT No.: PCT/CN2013/081278
§ 371 (c)(1),
(2) Date: May 22, 2015

(87) PCT Pub. No.: WO2014/029282
PCT Pub. Date: Feb. 27, 2014

(65) Prior Publication Data
US 2015/0365318 A1    Dec. 17, 2015

(30) Foreign Application Priority Data
Aug. 24, 2012 (CN) .......................... 2012 1 0305436

(51) Int. Cl.
*G06F 15/173* (2006.01)
*H04L 12/707* (2013.01)
(Continued)

(52) U.S. Cl.
CPC .......... *H04L 45/22* (2013.01); *G06F 11/0709* (2013.01); *G06F 11/079* (2013.01);
(Continued)

(58) Field of Classification Search
None
See application file for complete search history.

(56) References Cited

U.S. PATENT DOCUMENTS

| 7,039,005 B2 * | 5/2006 | Jenq | H04L 45/00 370/217 |
| 7,983,153 B2 * | 7/2011 | Filsfils | H04L 45/02 370/219 |
| 8,879,383 B1 * | 11/2014 | Cirkovic | H04L 45/00 370/219 |
| 9,100,329 B1 * | 8/2015 | Jiang | H04L 45/28 |

(Continued)

FOREIGN PATENT DOCUMENTS

EP    2028768    2/2009

OTHER PUBLICATIONS

International Search Report (Form PCT/ISA/210) for PCT/CN2013/081278 dated Nov. 14, 2013.
(Continued)

Primary Examiner — Joshua Joo
(74) Attorney, Agent, or Firm — Koppel, Patrick, Heybl & Philpott

(57) ABSTRACT

Disclosed are a cross-domain protection interacting method and system. The method includes: an interconnecting node on a cross-domain working path between a first domain and a second domain sends second identification information of the second domain to a first node in the first domain, wherein the first domain and the second domain are neighboring domains; when a link failure occurs in the first domain, an interconnecting backup node between the first domain and the second domain receives first failure state information sent by the first node, wherein the first failure state information carrying the second identification information; and the interconnecting backup node activates a second protection path in the second domain according to the second identification information, and uses a first protection path in the first domain and the second protection path to transmit a cross-domain service. The present invention can ensure protection independence in each domain and achieve an effect of interaction of cross-domain protection.

20 Claims, 4 Drawing Sheets

(51) Int. Cl.
*H04L 12/715* (2013.01)
*H04L 12/703* (2013.01)
*G06F 11/07* (2006.01)
*H04L 12/26* (2006.01)

(52) U.S. Cl.
CPC ...... *G06F 11/0751* (2013.01); *H04L 43/0811* (2013.01); *H04L 45/04* (2013.01); *H04L 45/28* (2013.01)

(56) References Cited

U.S. PATENT DOCUMENTS

| | | |
|---|---|---|
| 2003/0145246 A1 | 7/2003 | Suemura |
| 2006/0140111 A1* | 6/2006 | Vasseur .................. H04L 45/02 370/216 |
| 2006/0153067 A1* | 7/2006 | Vasseur ............... H04L 12/5695 370/217 |
| 2007/0076719 A1 | 4/2007 | Allan et al. |
| 2007/0091794 A1 | 4/2007 | Filsfils et al. |
| 2010/0146149 A1* | 6/2010 | Vasseur .................. H04L 45/02 709/239 |
| 2012/0195229 A1 | 8/2012 | Chen |
| 2013/0343180 A1* | 12/2013 | Kini ........................ H04L 45/22 370/228 |
| 2015/0244628 A1* | 8/2015 | Gredler .................. H04L 45/04 370/236 |

OTHER PUBLICATIONS

Supplemental European Search Report, Application No. 13830440, completed Aug. 27, 2015.

\* cited by examiner

CROSS-DOMAIN PROTECTION INTERACTING METHOD AND SYSTEM

TECHNICAL FIELD

The present invention relates to communication field, and in particular to a cross-domain protection interacting method and system.

BACKGROUND ART

For current various protection techniques, protection and recovery for services in a single domain are mainstream; but for protection and recovery of a cross-domain service, since protection protocols between various domains can not interact, a failure easily occur in the interconnecting node between two domains, so that the cross-domain service can not be recovered and protected timely.

Currently, the problem that protection methods for services in a single domain can not protect and recover a cross-domain service is solved mainly from the following aspects: 1. setting up or configuring a cross-domain end-to-end protection path to recover and protect a service, as shown in FIG. 1 (FIG. 1 is a diagram of cross-domain end-to-end protection according to related techniques); 2. using an in-domain protection method to protect and recover the cross-domain service segment by segment in a path to ensure independence of recovery and protection in each domain, so as to realize interaction of the cross-domain protection, see FIG. 2 (FIG. 2 is a diagram of cross-domain segment-by-segment protection according to related techniques). For the first method, since configuring a cross-domain protection path requires conformance of operation, administration, maintenance (simply OAM for short) protocols (such as an corresponding automatic protection switching (APS) message or a corresponding protection switching coordination (PSC) message and so on), it is difficult to realize; for the second method, since protection is independent in each domain, its interconnecting backup node does not know a protection path corresponding to a working path in another domain, so that switching to the protection path in another domain can not be triggered.

For the second method, it realizes the function of cross-domain protection interaction mainly by extending messages of OAM protocols (such as APS or PSC and so on). However, because an OAM detection mechanism based on a link layer is adopted during the ring network protection, when a failure occurs, APS messages or PSC messages sent along the link layer on the ring network are not aimed at APS messages or PSC messages on a specific path, and this is not convenient to carry the path to a corresponding working path on another adjacent domain, thereby causing cross-domain protection between two adjacent domains difficult to realize.

Aiming at the problem of difficult realization of cross-domain protection in the related techniques, effective solutions are not presented so far.

SUMMARY

The present invention provides a cross-domain protection interacting method and system for at least solving the above problem.

According to an aspect of the present invention, there is provided a cross-domain protection interacting method which includes: an interconnecting node on a cross-domain working path between a first domain and a second domain sends first identification information about the second domain to a first node in the first domain, wherein the first domain and the second domain are neighbouring domains; when a link failure occurs in the first domain, an interconnecting backup node between the first domain and the second domain receives first failure state information sent by the first node, wherein the first failure state information carries the first identification information; and the interconnecting backup node activates a second protection path in the second domain according to the first identification information, and uses a first protection path in the first domain and the second protection path to transmit a cross-domain service.

Preferably, the first protection path is a backup path which is configured in advance for a first working branch path and connected between the first node and the interconnecting backup node, the first working branch path being a branch path of the cross-domain working path within the first domain; and the second protection path is a backup path which is configured in advance for a second working branch path and connected between the second node of the second domain and the interconnecting backup node, the second working branch path being a branch path of the cross-domain working path within the second domain.

Preferably, the interconnecting node on the cross-domain working path between the first domain and the second domain sends the first identification information about the second domain to the first node in the first domain includes: the interconnecting node generates a first message or a first signalling information carrying the first identification information for the second domain; and the interconnecting node sends the first message or the first signalling information to the first node.

Preferably, before the interconnecting backup node between the first domain and the second domain receives the first failure state information sent by the first node, the method also includes: the first node saves the first identification information; and when the first node judges that failures occur in both a backup link between the interconnecting node and the interconnecting backup node and the first working branch path, the first node carries the saved first identification information in the first failure state information and sends same to the interconnecting backup node.

Preferably, the first identification information carries one of the following combinatorial information: a second domain identification of the second domain and a second working branch path identification of the second working branch path; the second domain identification and a second protection path identification of the second protection path; and the second domain identification, the second working branch path identification and the second protection path identification.

Preferably, before or after the interconnecting node on the cross-domain working path between the first domain and the second domain sends the first identification information about the second domain to the first node in the first domain, the method further includes: the interconnecting node sends a second identification information about the first domain to the second node, the second identification information carrying one of the following combinatorial information: a first domain identification of the first domain and a first working branch path identification of the first working branch path; the first domain identification and a first protection path identification of the first protection path; and the first domain identification, the first working branch path identification and the first protection path identification.

Preferably, the interconnecting node sends the second identification information about the first domain to the second node includes: the interconnecting node generates a second message or second signalling information carrying the second identification information for the first domain; and the interconnecting node sends the second message or the second signalling information to the second node.

Preferably, the first node is a service ingress and egress border node in the first domain, and the second node is a service ingress and egress border node in the second domain.

Preferably, both the first identification information and the second identification information are one of the following: an automatic protection switching (APS) state message, and a protection switching coordination (PSC) state message.

According to another aspect of the present invention, there is provided a cross-domain protection interacting system, which includes: a first node in a first domain, a second node in a second domain and an interconnecting node and an interconnecting backup node between the first domain and the second domain, wherein the interconnecting node includes: a first sending module configured to send first identification information about the second domain to the first node, the first domain and the second domain being neighbouring domains; and the interconnecting backup node includes: a receiving module configured to receive first failure state information sent by the first node when a link failure occurs in the first domain, the first failure state information carrying the first identification information; and an activating module configured to activate a second protection path in the second domain according to the first identification information, and use a first protection path in the first domain and the second protection path to implement cross-domain service transmission.

Preferably, the first protection path is a backup path which is configured in advance for a first working branch path and connected between the first node and the interconnecting backup node, wherein the first working branch path is a branch path of the cross-domain working path within the first domain; and the second protection path is a backup path which is configured in advance for a second working branch path and connected between the second node of the second domain and the interconnecting backup node, the second working branch path being a branch path of the cross-domain working path within the second domain.

Preferably, the first sending module includes: a first generating unit configured to generate a first message or first signalling information carrying the first identification information for the second domain; and a first sending unit configured to send the first message or the first signalling information to the first node.

Preferably, the first node includes: a saving module configured to save the first identification information before the receiving module receives the first failure state information; and a judging and sending module configured to, when it is judged that failures occur in both a backup link between the interconnecting node and the interconnecting backup node and the first working branch path, carry the saved first identification information in the first failure state information and send same to the interconnecting backup node.

Preferably, the first identification information carries one of the following combinatorial information: a second domain identification of the second domain and a second working branch path identification of the second working branch path; the second domain identification and a second protection path identification of the second protection path; and the second domain identification, the second working branch path identification and the second protection path identification.

Preferably, the interconnecting node further includes: a second sending module configured to send a second identification information about the first domain to the second node before or after the first sending module sends the first identification information to the first node, the second identification information carrying one of the following combinatorial information: a first domain identification of the first domain and a first working branch path identification of the first working branch path; the first domain identification and a first protection path identification of the first protection path; and the first domain identification, the first working branch path identification and the first protection path identification.

Preferably, the second sending module includes: a second generating unit configured to generate a second message or second signalling information carrying the second identification information for the first domain; and a second sending unit configured to send the second message or the second signalling information to the second node.

Preferably, the first node is a service ingress and egress border node in the first domain, and the second node is a service ingress and egress border node in the second domain.

Preferably, both the first identification information and the second identification information are one of the following: an automatic protection switching (APS) state message, and a protection switching coordination (PSC) state message.

Through the present invention, by using a way that a local end node sends a domain identification, a working path identification and a protection path identification in a local domain to an opposite end node, the problem of difficult realization of cross-domain protection in the related techniques is solved, and this can avoid complexity of establishing a cross-domain protection path, and at the same time can ensure the protection independence in each domain and effectively realize interaction and operability of cross-domain protection, and further realize protection coordination between various domains and correct protection and recovery for cross-domain services, and therefore compared to an original cross-domain protection path configured statically, this reaches an effect of ensuring protection independence in various domains so as to achieve an effect of interaction of cross-domain protection.

BRIEF DESCRIPTION OF THE DRAWINGS

The drawings described herein, which is used to provide a further understanding of the present invention, constitutes a part of this application, and the schematic embodiments of the present invention and their description are used to explain the present invention and does not constitute an inappropriate limitation of the present invention. In the drawings.

DETAILED DESCRIPTION OF EMBODIMENTS

Figure 1:
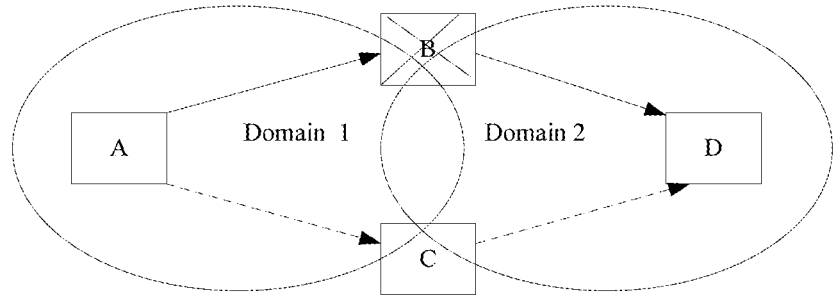
FIG. 1 is a diagram of cross-domain end-to-end protection according to the related techniques.

The present invention will be described below with reference to the drawing and in conjunction with the embodiments. It should be noted that the embodiments and the characteristics of the embodiments can be combined with each other if no conflict is caused.

Figure 3:
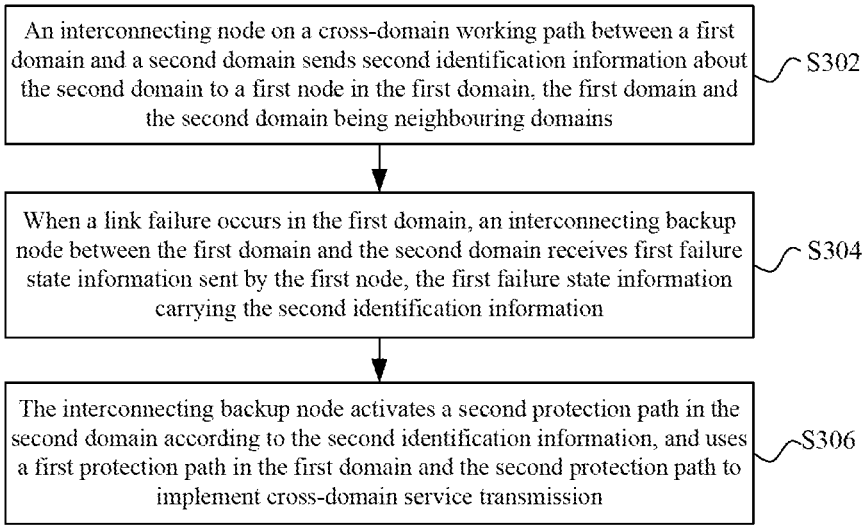
FIG. 3 is a flowchart of a cross-domain protection interacting method according to an embodiment of the present invention.

FIG. 3 is a flowchart of a cross-domain protection interacting method according to an embodiment of the present invention, and as shown in FIG. 3, the method mainly includes the following steps (step S302 to step S306):

Step S302: an interconnecting node on a cross-domain working path between a first domain and the second domain sends first identification information about the second domain to a first node in the first domain, the first domain and the second domain being neighbouring domains.

Step S304: when a link failure occurs in the first domain, an interconnecting backup node between the first domain and the second domain receives first failure state information sent by the first node, the first failure state information carrying the first identification information.

Step S306: the interconnecting backup node activates a second protection path in the second domain according to the first identification information, and uses a first protection path in the first domain and the second protection path to implement cross-domain service transmission.

In the present embodiment, the first protection path is a backup path which is configured in advance for a first working branch path and connected between the first node and the interconnecting backup node, wherein the first working branch path is a branch path of the cross-domain working path within the first domain; and the second protection path is a backup path which is configured in advance for a second working branch path and connected between the second node of the second domain and the interconnecting backup node, wherein the second working branch path is a branch path of the cross-domain working path within the second domain.

In the present embodiment, an interconnecting node on a cross-domain working path between a first domain and a second domain sends first identification information about the second domain to a first node in the first domain includes: the interconnecting node generating a first message or a first signalling information carrying the first identification information for the second domain; and the interconnecting node sends the first message or the first signalling information to the first node.

In the present embodiment, before the interconnecting backup node between the first domain and the second domain receives the first failure state information sent by the first node, the method also includes: the first node saving the first identification information; and when judging that failures occur in both a backup link between the interconnecting node and the interconnecting backup node and the first working branch path, the first node carrying the saved first identification information in the first failure state information and sends same to the interconnecting backup node.

Preferably, the first identification information carries one of the following combinatorial information: a second domain identification of the second domain and a second working branch path identification of the second working branch path; the second domain identification and a second protection path identification of the second protection path; and the second domain identification, the second working branch path identification and the second protection path identification.

In the present embodiment, before or after the interconnecting node on the cross-domain working path between the first domain and the second domain sends the first identification information about the second domain to the first node in the first domain, the method further includes: the interconnecting node sends a second identification information about the first domain to the second node, wherein the second identification information carries one of the following combinatorial information: a first domain identification of the first domain and a first working branch path identification of the first working branch path; the first domain identification and a first protection path identification of the first protection path; and the first domain identification, the first working branch path identification and the first protection path identification.

In the present embodiment, the interconnecting node sends the second identification information about the first domain to the second node includes: the interconnecting node generating a second message or second signalling information carrying the second identification information for the first domain; and the interconnecting node sends the second message or the second signalling information to the second node.

Preferably, the first node is a service ingress and egress border node in the first domain, and the second node is a service ingress and egress border node in the second domain.

Preferably, both the first identification information and the second identification information are one of the following: an automatic protection switching (APS) state message, and a protection switching coordination (PSC) state message.

In the following, on the basis of a working scene shown in FIG. 2 and in combination with the real situation, the above cross-domain protection interacting method is illustrated specifically, and the detailed flow of cross-domain protection interaction is as followings:

1. For a cross-domain path (A-B-D) (namely the working path simultaneously crossing the first domain and the second domain) shown in FIG. 2, within each single domain (namely the above first domain or the second domain), a corresponding linear protection link (namely the above first protection path or the second protection path) is configured for partial links (namely the above first link or the second link) of the cross-domain path in the single domain; as shown in FIG. 2, a corresponding protection path of A-B (namely the first link) in domain 1 (namely the first domain) is A-C (namely the first protection path), and a corresponding protection path of B-D segment (namely the second link) in domain 2 (namely the second domain) is C-D (namely the second protection path).

Figure 5:
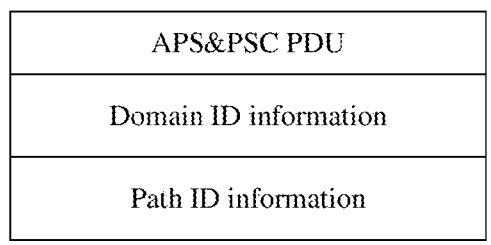
FIG. 5 is a structural diagram of an extended status message according to a preferred embodiment of the present invention.

2. Under normal circumstances for a cross-domain path, an end node (namely the above interconnecting node) of a partial link on the cross-domain path in each single domain periodically sends extended status messages (a format of the state messages can be seen in FIG. 5), such as extended APS or PSC state messages and so on; the state messages contain a domain identification (domain ID, namely a first domain identification or a second domain identification) of an adjacent domain (for the first domain, the second domain is an adjacent domain) and a working path identification (namely a first working branch path identification or a second working branch path identification) of a partial working path in the domain or/and an identification (namely a first protection path identification or a second protection path identification) of a protection path corresponding to the partial working path.

3. The interconnecting node on the working path sends a state message generated by a working node (namely the first node or the second node) in a single domain to a working node (namely the first node or the second node) in an opposite end single domain (namely an adjacent domain) along a corresponding partial working path, and the state message is received and processed by two working nodes, and a domain identification of its adjacent domain and a working path identification or/and a protection path identification of a corresponding partial working path in the domain are parsed from the state message and saved.

4. When a node (the first node or the second node) in a certain domain on the cross-domain path detects that a failure occurs in a partial link in its local domain (namely the partial link in its local domain is the first working branch path or the second working branch path), then an information message about state change can be sent to an opposite end node via a protection path for protecting the link segment, so as to activate or trigger the path switching or activate or bind a corresponding protection path on another domain according to a domain identification of an adjacent domain or a working path identification and/or a protection path identification carried in the information message.

5. When the interconnecting node receives the message about state change sent by the opposite end node, it activates or deactivates the protection path on another domain to perform service transmission; but for an opposite end node on a protection path in another adjacent domain, the merger selector receiving service is performed; or switching information is sent to an opposite end node of a protection path in another domain, and a protection path is selected to receive the service; but when a failure does not occur on the working path in the domain, switching is executed also.

Figure 4:
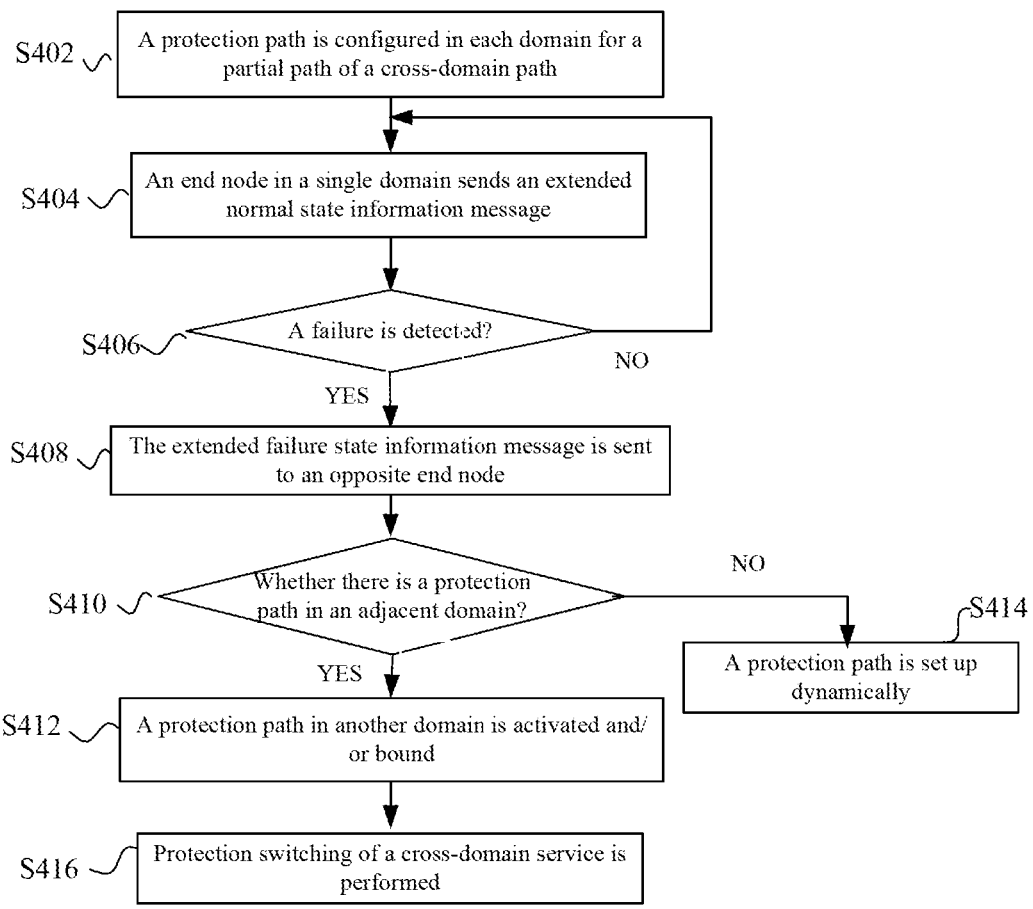
FIG. 4 is an implementing flowchart of a cross-domain protection interacting method according to a preferred embodiment of the present invention.

The above cross-domain protection interacting method is described below in more detail in combination with FIG. 4 and a preferred embodiment.

Figure 2:
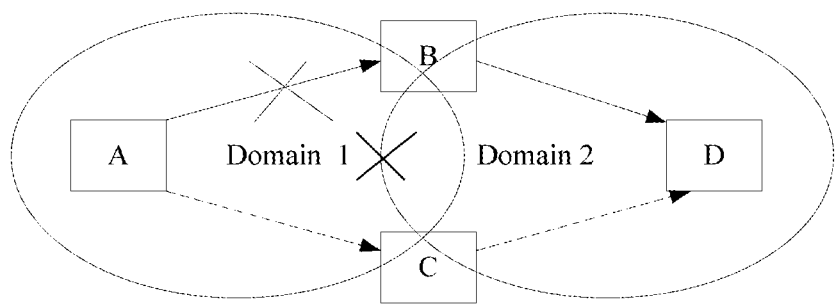
FIG. 2 is a diagram of cross-domain segment-by-segment protection according to the related techniques.

It should be noted that, the preferred embodiment is based on the working scene shown in FIG. 2, and the automatic protection switching (APS) state message is described only as an example in the preferred embodiment. FIG. 4 is an implementing flowchart of a cross-domain protection interacting method according to a preferred embodiment of the present invention, and as shown in FIG. 4, the flow includes the following steps (step S402 to step S416):

Step S402, for a working path (A-B-D) crossing two domains, a corresponding protection path (A-C) is configured in domain 1, and another protection path (C-D) is configured in domain 2 to protect a partial path (B-D) of the cross-domain path in domain 2.

Step S404, on a partial working path in the single domain, end node B sends a domain identification ID of the adjacent domain 2 and an identification ID of path B-D via an extended APS state information message or an extended PSC state information message to opposite end node A in domain 1, and sends a domain identification ID of the adjacent domain 1 and an identification ID of path A-B to opposite end node D in domain 2; after node A in domain 1 and/or node D in domain 2 receives the state information message sent by node B, it performs receiving process, and saves the domain identification ID and the path identification ID carried in the information message, so as to inform an opposite end node C on the protection path in case of failure.

Step S406, the opposite end node A in domain 1 or the opposite end node D in domain 2 performs a failure detection on the partial working path in its local domain, and if a failure is detected, then step S408 is executed, otherwise going to step S404.

Step S408, when node A or D detects that there are failures on both the working path (A-B or B-D) thereon and the protection path in a corresponding domain, a failure state information message carrying the identification ID of domain 2 and/or the identification ID of path (B-D) or the identification ID of domain 1 and/or the identification ID of path (A-B) is then sent to node C via the protection path (A-C) or (D-C).

Step S410, when the interconnecting backup node C receives the failure state information message sent by node A or D, it is judged whether there is a corresponding protection path in the adjacent domain, and if yes, step S412 is executed, otherwise executing step S414.

Step S412, a corresponding protection path on another domain is activated or bound according to the domain ID and/or the path ID carried by the failure state information message; for example, after detecting a failure, A informs node C to activate or bind the protection path corresponding to the working path (B-D) in domain 2 so as to send cross-domain services via the corresponding protection path (A-C-D).

Step S414, a protection path in domain 1 or domain 2 is set up dynamically.

Step S416, after the interconnecting backup node (node C) activates or binds a protection path on another domain, by the APS state message or the PSC state message, it can negotiate with opposite end node A or D for switching, thereby performing a protection switching of cross-domain services.

By utilizing the cross-domain protection interacting method provided in the above embodiment, the complexity of establishing the cross-domain protection path can be avoided, and at the same time the protection independence in each domain can be ensured and the interaction and operability of cross-domain protection can be effectively realized, and further the protection coordination between various domains is realized and cross-domain services are correctly protected and recovered, thereby ensuring the protection independence in various domains compared to an original statically configured cross-domain protection path so as to achieve an effect of interaction of cross-domain.

Figure 6:
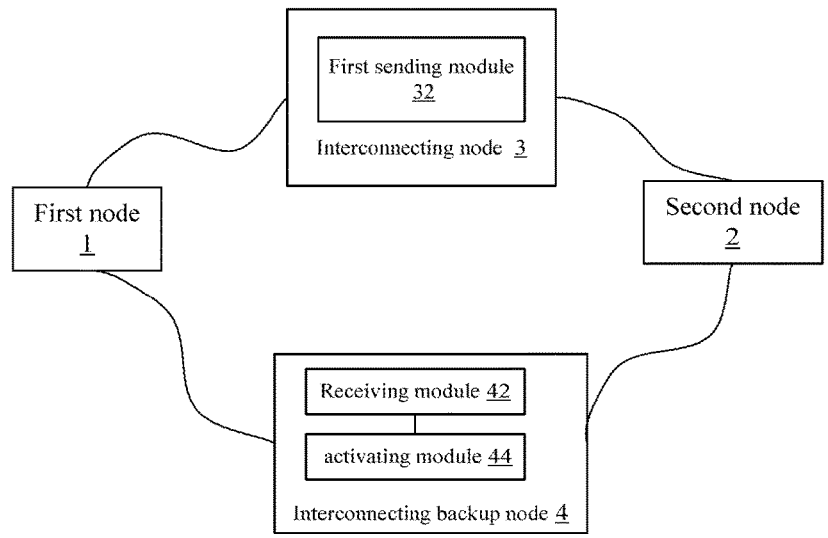
FIG. 6 is a structural diagram of a cross-domain protection interacting system according to an embodiment of the present invention.

FIG. 6 is structural diagram of a cross-domain protection interacting system according to an embodiment of the present invention, and the system is used for realizing the above cross-domain protection interacting method. As shown in FIG. 6, the system includes: a first node 1 in a first domain, a second node 2 in a second domain and an interconnecting node 3 and an interconnecting backup node 4 between the first domain and the second domain. Wherein the interconnecting node 3 includes: a first sending module 32 configured to send first identification information about the second domain to the first node 1, wherein the first domain and the second domain are neighbouring domains; and the interconnecting backup node 4 includes: a receiving module 42 configured to receive the first failure state information sent by the first node 1 when a link failure occurs in the first domain, wherein the first failure state information carries the first identification information; and an activating module 44 configured to activate a second protection path in the second domain according to the first identification information, and use a first protection path in the first domain and the second protection path to implement cross-domain service transmission.

Preferably, the first protection path is a backup path which is configured in advance for a first working branch path and connected between the first node 1 and the interconnecting backup node 4, wherein the first working branch path is a branch path of the cross-domain working path within the first domain; and the second protection path is a backup path which is configured in advance for a second working branch path and connected between the second node 2 of the second domain and the interconnecting backup node 4, wherein the second working branch path are a branch path of the cross-domain working path within the second domain.

Figure 7:
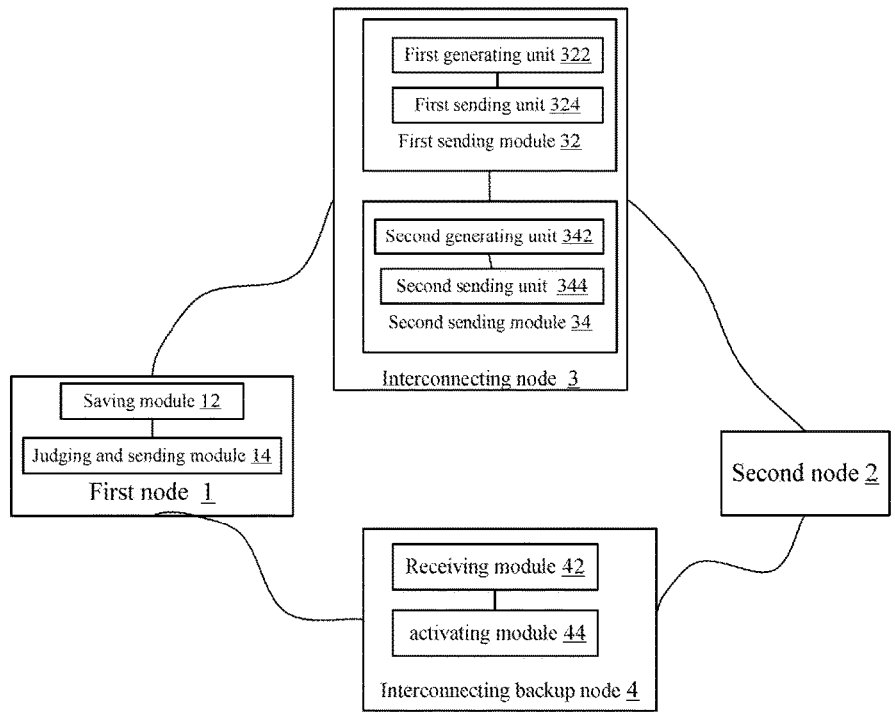
FIG. 7 is structural diagram of a cross-domain protection interacting system according to a preferred embodiment of the present invention.

FIG. 7 is structural diagram of a cross-domain protection interacting system according to a preferred embodiment of the present invention, and as shown in FIG. 7, in the system provided by the preferred embodiment, preferably the first sending module 32 includes: a first generating unit 322 configured to generate a first message or first signalling information carrying the first identification information for the second domain; and a first sending unit 324 configured to send the first message or the first signalling information to the first node 1.

In the system provided by the preferred embodiment, the first node 1 includes: a saving module 12 configured to save the first identification information before the receiving module receives the first failure state information; and a judging and sending module 14 configured to, when it is judged that failures occur in both a backup link between the interconnecting node 3 and the interconnecting backup node 4 and the first working branch path, carry the saved first identification information in the first failure state information and send same to the interconnecting backup node.

Preferably, the first identification information carries one of the following combinatorial information: a second domain identification of the second domain and a second working branch path identification of the second working branch path; the second domain identification and a second protection path identification of the second protection path; and the second domain identification, the second working branch path identification and the second protection path identification.

In the system provided by the preferred embodiment, the interconnecting node 3 also includes: a second sending module 34 configured to send a second identification information about the first domain to the second node 2 before or after the first sending module sends the first identification information to the first node 1, the second first identification information carrying one of the following combinatorial information: a first domain identification of the first domain and a first working branch path identification of the first working branch path; the first domain identification and a first protection path identification of the first protection path; and the first domain identification, the first working branch path identification and the first protection path identification.

In the system provided by the preferred embodiment, the second sending module 34 includes: a second generating unit 342 configured to generate a first message or second signalling information carrying the second identification information for the first domain; and a second sending unit 344 configured to send the second message or the second signalling information to the second node 2.

Preferably, the first node 1 is a service ingress and egress border node in the first domain, and the second node 2 is a service ingress and egress border node in the second domain.

Preferably, both the first identification information and the second identification information are one of the following: an automatic protection switching (APS) state message, and a protection switching coordination (PSC) state message.

It should be noted that, the preferred embodiment shown in FIG. 7 is only a better implementation, and in a practical application, a cross-domain protection interacting system can be composed exactly in another way or structure. For example, another preferred system shown in FIG. 8 may also realize the same function of the preferred system shown in FIG. 7.

Figure 8:
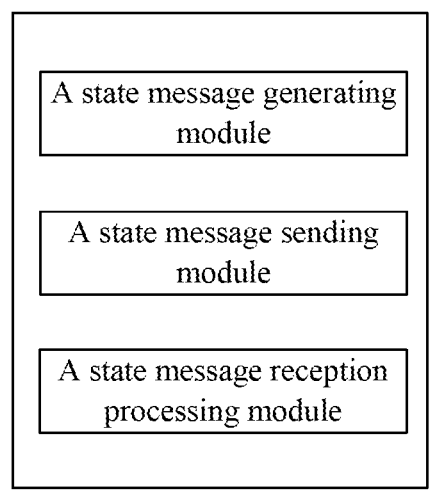
FIG. 8 is a composition diagram of a cross-domain protection interacting system according to another preferred embodiment of the present invention.

FIG. 8 is a composition diagram of a cross-domain protection interacting system according to another preferred embodiment of the present invention, and as shown in FIG. 8, the system is composed mainly of three modules which are briefly introduced below, and its implementation and principle are same to those of the above cross-domain protection interacting method.

A state message generating module: the module refers mainly that two end nodes on a transmission path (an entity) generate state messages (including original local domain information messages and subsequent state failure messages).

A state message sending module: the module refers mainly that two end nodes after state negotiation send state messages (including original local domain information messages and subsequent state failure messages) to opposite end nodes via partial working paths in respective domains, so that opposite end nodes trigger or activate the corresponding protection switching or binding of protection paths.

A state message reception processing module: the module refers mainly that after two end nodes after state negotiation receive a state message working node (namely the first node or the second node) sent by a far end node, analysis processing is performed so as to trigger or activate the corresponding protection switching or binding of protection paths By utilizing the cross-domain protection interacting system provided in the above embodiment, the complexity of establishing the cross-domain protection path can be avoided, and at the same time the protection independence in each domain is ensured and the interaction and operability of cross-domain protection can be effectively realized, and further the protection coordination of various domains is realized and cross-domain services are correctly protected and recovered, thereby ensuring the protection independence in various domains compared to an original statically configured cross-domain protection path, so as to achieve an effect of interaction of cross-domain protection.

From the above description, it can be seen that the present invention realizes the following technical advantages:

By utilizing the above cross-domain protection interacting method and system, the complexity of establishing the cross-domain protection path can be avoided, and at the same time the protection independence in each domain is ensured and the interaction and operability of cross-domain protection can be effectively realized, and further the protection coordination of various domains is realized and cross-domain services are correctly protected and recovered, thereby ensuring the protection independence in various domains compared to an original statically configured cross-domain protection path, so as to achieve an effect of interaction of cross-domain protection.

Apparently, those skilled in the art shall understand that the above modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the present invention is not restricted to any particular hardware and software combination.

The above description is only preferred embodiments of the present invention and is not intended to limit the present invention, and the present invention can have a variety of changes and modifications for ordinary person skilled in the field. Any modification, equivalent replacement, or improvement made within the principle of the present invention shall all fall within the protection scope of the present invention.

What is claimed is:

1. A cross-domain protection interacting method, comprising:
   an interconnecting node on a cross-domain working path between a first domain and a second domain sending first identification information about the second domain to a first node in the first domain, wherein the first domain and the second domain are neighbouring domains;
   when a link failure occurs in the first domain, an interconnecting backup node between the first domain and the second domain receiving first failure state information sent by the first node, wherein the first failure state information carries the first identification information; and
   the interconnecting backup node activating a second protection path in the second domain according to the first identification information, and using a first protection path in the first domain and the second protection path to transmit a cross-domain service.

2. The method according to claim 1, wherein
   the first protection path is a backup path which is configured in advance for a first working branch path and connected between the first node and the interconnecting backup node, the first working branch path being a branch path of the cross-domain working path within the first domain; and
   the second protection path is a backup path which is configured in advance for a second working branch path and connected between a second node of the second domain and the interconnecting backup node, the second working branch path being a branch path of the cross-domain working path within the second domain.

3. The method according to claim 1, wherein the interconnecting node on the cross-domain working path between the first domain and the second domain sending the first identification information about the second domain to the first node in the first domain comprises:
   the interconnecting node generating a first message or first signalling information carrying the first identification information for the second domain; and
   the interconnecting node sending the first message or the first signalling information to the first node.

4. The method according to claim 2, wherein before the interconnecting backup node between the first domain and the second domain receives the first failure state information sent by the first node, the method further comprises:
   the first node saving the first identification information; and
   when the first node judges that failures occur in both a backup link between the interconnecting node and the interconnecting backup node and the first working branch path, the first node carrying the saved first identification information in the first failure state information and sending the first failure state information carrying the saved first identification information to the interconnecting backup node.

5. The method according to claim 1 wherein the first identification information carries one of the following combinatorial information:
   a second domain identification of the second domain and a second working branch path identification of a second working branch path;
   the second domain identification and a second protection path identification of the second protection path; and
   the second domain identification, the second working branch path identification and the second protection path identification.

6. The method according to claim 5, wherein before or after the interconnecting node on the cross-domain working path between the first domain and the second domain sends the first identification information to the first node in the first domain, the method further comprises:
   the interconnecting node sending a second identification information about the first domain to a second node, wherein the second identification information carrying one of the following combinatorial information:
   a first domain identification of the first domain and a first working branch path identification of a first working branch path;
   the first domain identification and a first protection path identification of the first protection path; and
   the first domain identification, the first working branch path identification and the first protection path identification.

7. The method according to claim 6, wherein the interconnecting node sending the second identification information about the first domain to the second node comprises:
   the interconnecting node generating a second message or second signalling information carrying the second identification information for the first domain; and
   the interconnecting node sending the second message or the second signalling information to the second node.

8. The method according to claim 6, wherein the first node is a service ingress and egress border node in the first domain and a second node of the second domain is a service ingress and egress border node in the second domain.

9. The method according to claim 6, wherein both the first identification information and the second identification information are one of the following:
   an automatic protection switching (APS) state message, and a protection switching coordination (PSC) state message.

10. The method according to claim 2, wherein the interconnecting node on the cross-domain working path between the first domain and the second domain sending the first identification information about the second domain to the first node in the first domain comprises:
    the interconnecting node generating a first message or first signalling information carrying the first identification information for the second domain; and
    the interconnecting node sending the first message or the first signalling information to the first node.

11. The method according to claim 2, wherein the first identification information carries one of the following combinatorial information:
- a second domain identification of the second domain and a second working branch path identification of the second working branch path;
- the second domain identification and a second protection path identification of the second protection path; and
- the second domain identification, the second working branch path identification and the second protection path identification.

12. A cross-domain protection interacting system, comprising:
a first node in a first domain, a second node in a second domain and an interconnecting node on a cross-domain working path, and an interconnecting backup node between the first domain and the second domain,
wherein the interconnecting node comprises a first hardware processor configured to execute first program modules stored on a first memory, the first program modules comprising:
a first sending module configured to send first identification information about the second domain to the first node, the first domain and the second domain being neighbouring domains; and
the interconnecting backup node comprises a second hardware processor configured to execute second program modules stored on a second memory, the second program modules comprising:
a receiving module configured to receive first failure state information sent by the first node when a link failure occurs in the first domain, the first failure state information carrying the first identification information; and
an activating module configured to activate a second protection path in the second domain according to the first identification information, and use a first protection path in the first domain and the second protection path to transmit a cross-domain service.

13. The system according to claim 12, wherein
the first protection path is a backup path which is configured in advance for a first working branch path and connected between the first node and the interconnecting backup node, the first working branch path being a branch path of a cross-domain working path within the first domain; and
the second protection path is a backup path which is configured in advance for a second working branch path and connected between the second node of the second domain and the interconnecting backup node, the second working branch path being a branch path of a cross-domain working path within the second domain.

14. The system according to claim 13, wherein the first sending module comprises:
a first generating unit configured to generate a first message or first signalling information carrying the first identification information for the second domain; and
a first sending unit configured to send the first message or the first signalling information to the first node.

15. The system according to claim 14, wherein the first node comprises a third hardware processor configured to execute third program modules stored on a third memory, the third program modules comprising:
a saving module configured to save the first identification information before the receiving module receives the first failure state information; and
a judging and sending module configured to, when it is judged that failures occur in both a backup link between the interconnecting node and the interconnecting backup node and the first working branch path, carry the saved first identification information in the first failure state information and send the first failure state information carrying the saved first identification information to the interconnecting backup node.

16. The system according to claim 12, wherein the first identification information carries one of the following combinatorial information:
- a second domain identification of the second domain and a second working branch path identification of a second working branch path;
- the second domain identification and a second protection path identification of the second protection path; and
- the second domain identification, the second working branch path identification and the second protection path identification.

17. The system according to claim 16, wherein the first program modules further comprise:
a second sending module configured to send a second identification information about the first domain to the second node before or after the first sending module sends the first identification information to the first node, the second identification information carrying one of the following combinatorial information:
- a first domain identification of the first domain and a first working branch path identification of a first working branch path;
- the first domain identification and a first protection path identification of the first protection path; and
- the first domain identification, the first working branch path identification and the first protection path identification.

18. The system according to claim 17, wherein the second sending module comprises:
a second generating unit configured to generate a second message or second signalling information carrying the second identification information for the first domain; and
a second sending unit configured to send the second message or the second signalling information to the second node.

19. The system according to claim 17, wherein the first node is a service ingress and egress border node in the first domain and the second node is a service ingress and egress border node in the second domain.

20. The system according to claim 17, wherein both the first identification information and the second identification information are one of the following:
an automatic protection switching (APS) state message, and a protection switching coordination (PSC) state message.

* * * * *